N. A. CHRISTENSEN.
AIR BRAKE SYSTEM AND APPARATUS.
APPLICATION FILED JUNE 14, 1912.
1,116,564.
Patented Nov. 10, 1914.
5 SHEETS—SHEET 1.
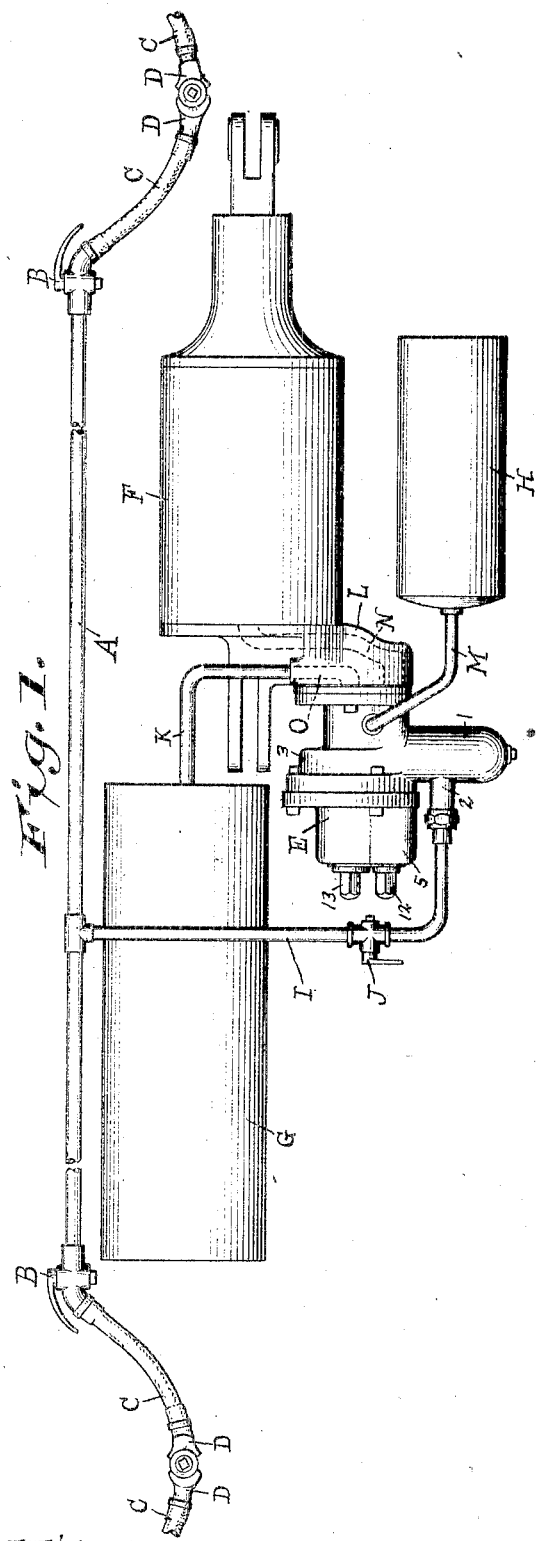
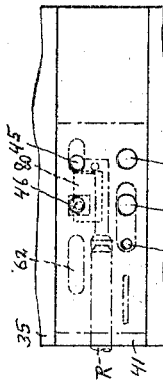
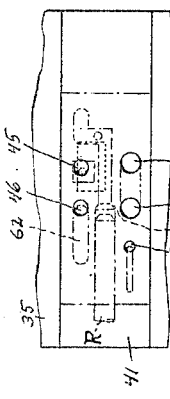
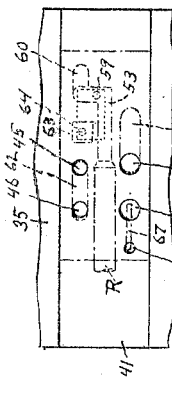
Witnesses:
Fred Palm
F. E. Dennett
Inventor:
Niels A. Christensen
By Flanders Bottum Fawsett Bottum
Attorneys.

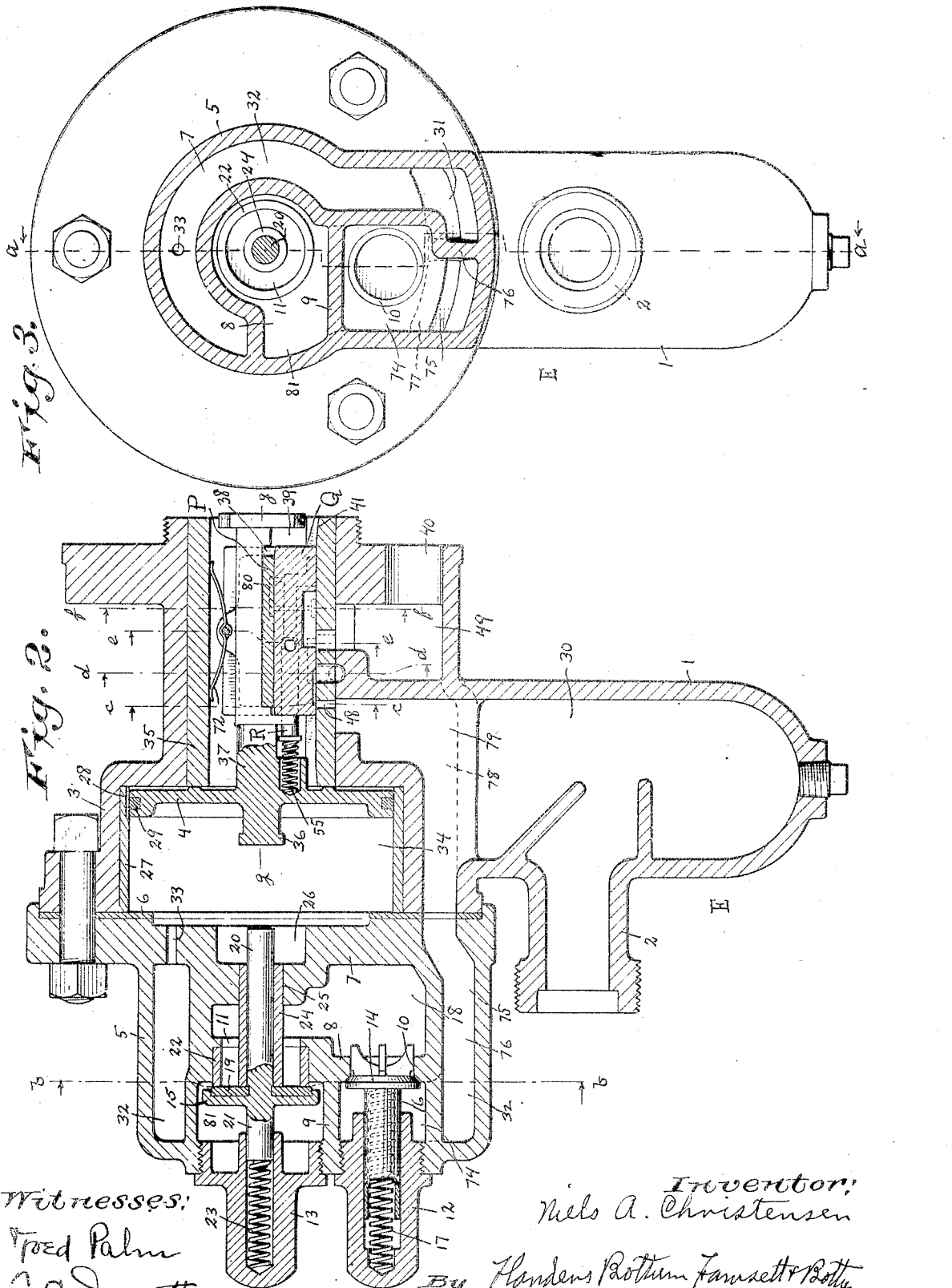

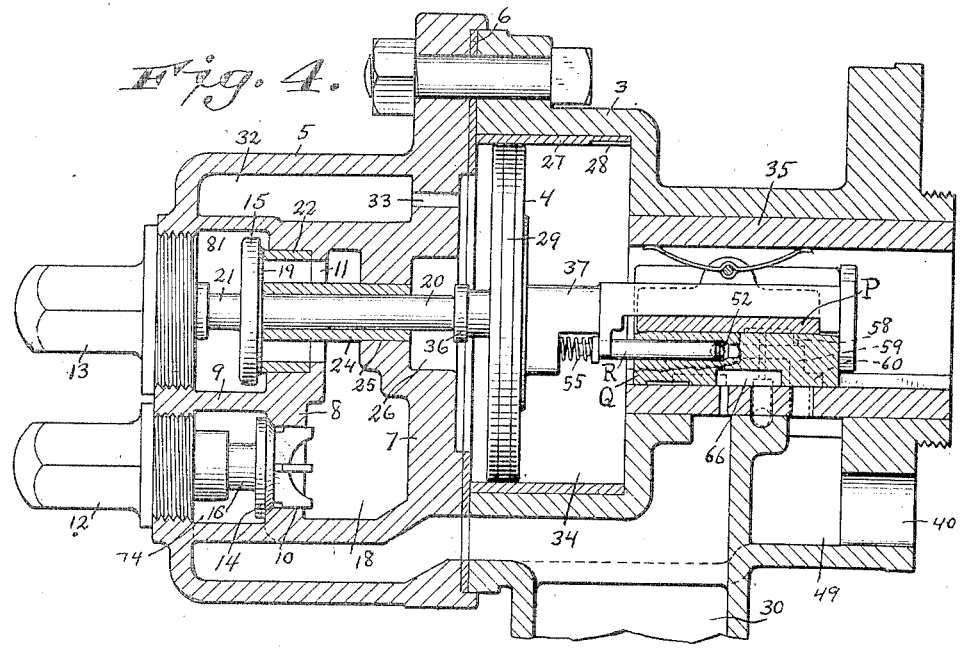
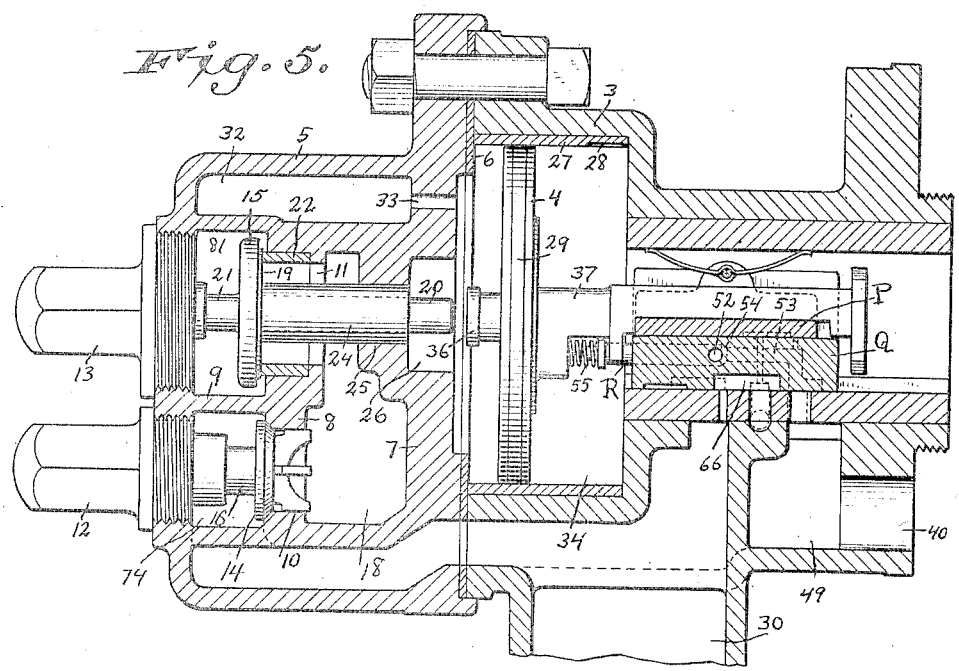

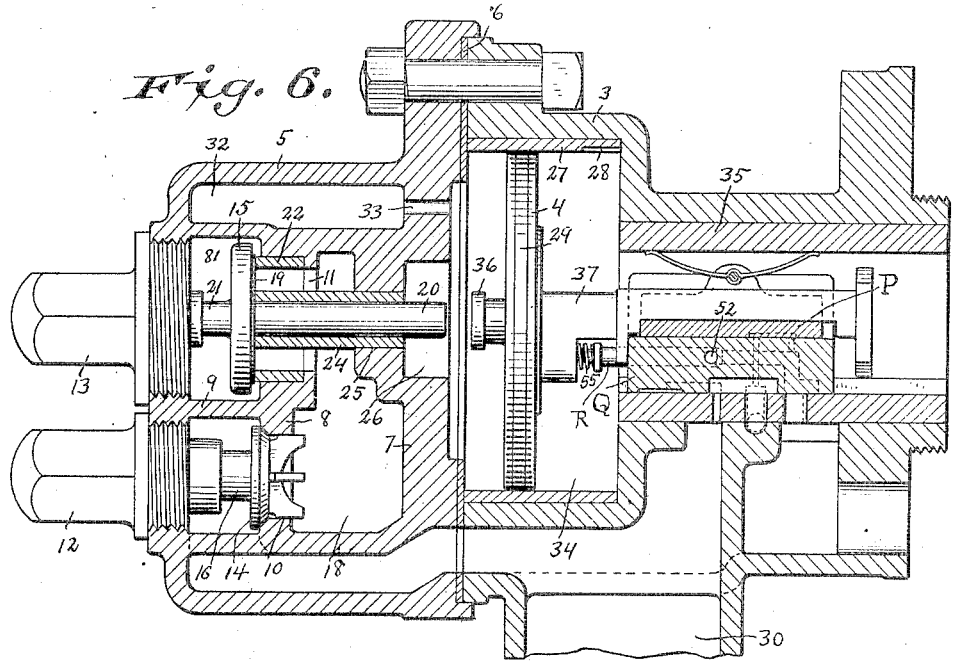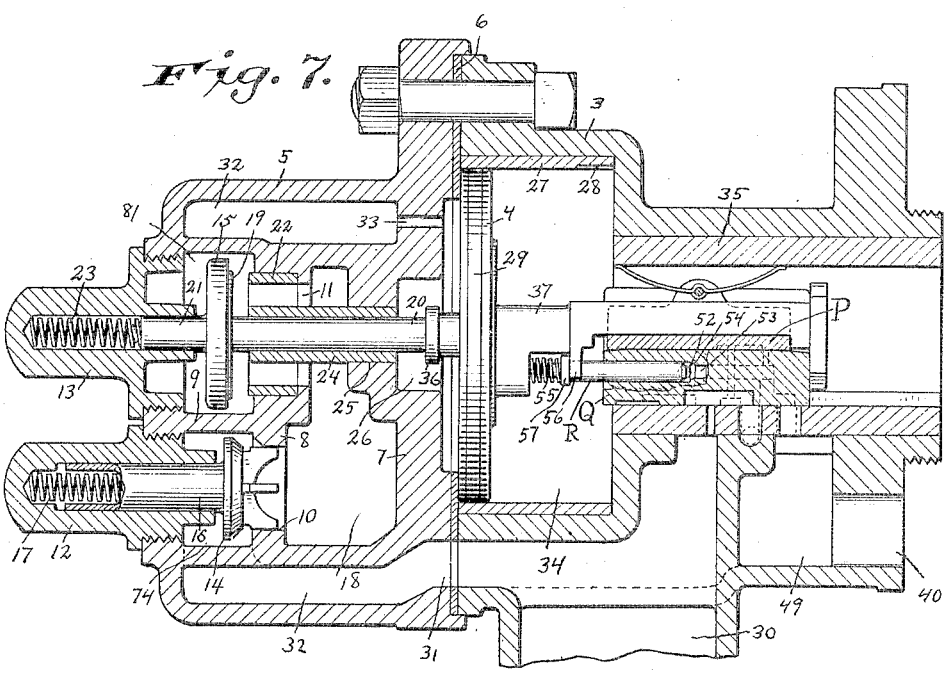

N. A. CHRISTENSEN.
AIR BRAKE SYSTEM AND APPARATUS.
APPLICATION FILED JUNE 14, 1912.
1,116,564.
Patented Nov. 10, 1914.
5 SHEETS—SHEET 5.
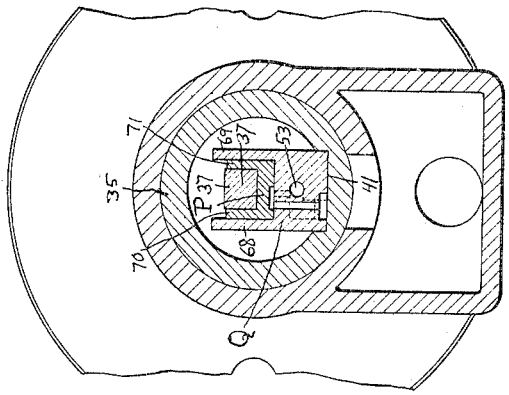
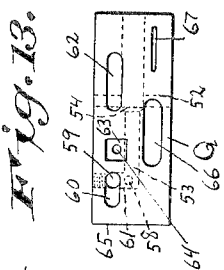
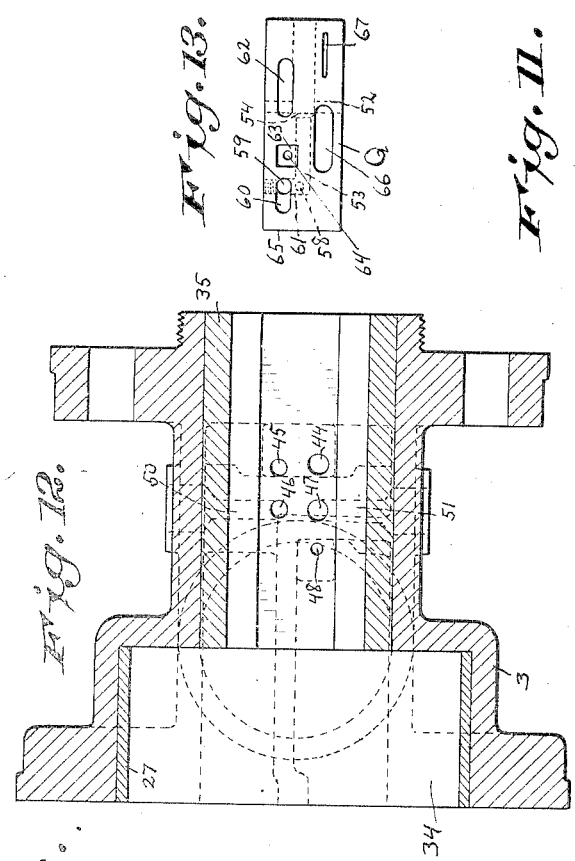
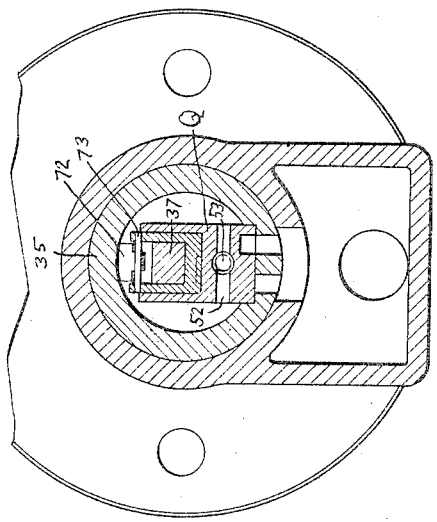
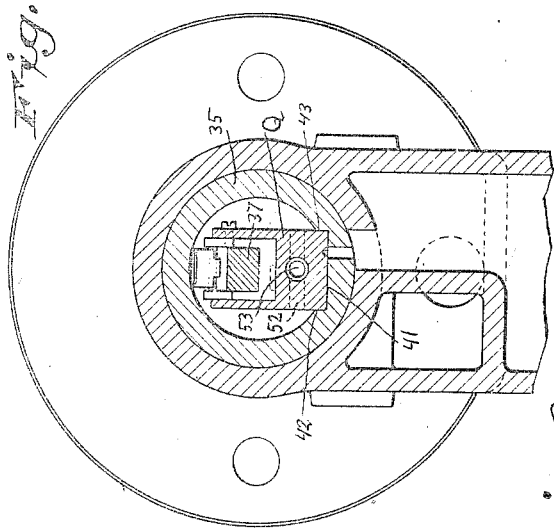
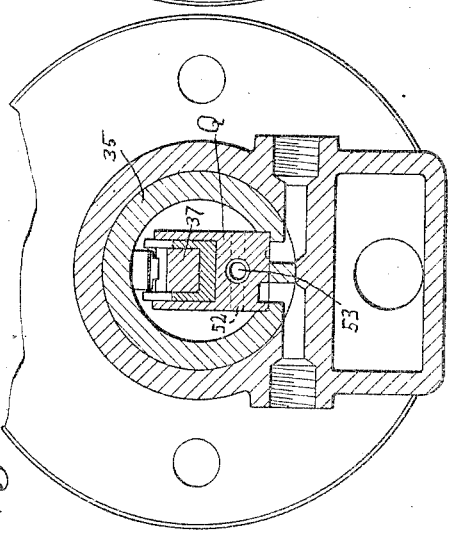
Witnesses:
Fred Palm
F. E. Dennett
Inventor:
Niels A. Christensen
By Flanders Bottum Fravett Bottum
Attorneys.

UNITED STATES PATENT OFFICE.

NIELS A. CHRISTENSEN, OF MILWAUKEE, WISCONSIN.

AIR-BRAKE SYSTEM AND APPARATUS.

1,116,564. Specification of Letters Patent. Patented Nov. 10, 1914.

Application filed June 14, 1912. Serial No. 703,599.

*To all whom it may concern:*

Be it known that I, NIELS A. CHRISTENSEN, a subject of the Kingdom of Denmark, residing at Milwaukee, in the county of Milwaukee and State of Wisconsin, have invented certain new and useful Improvements in Air-Brake Systems and Apparatus, of which the following is a specification, reference being had to the accompanying drawing, forming a part thereof.

This invention relates to air brake systems and apparatus therefor, and the objects of the invention are to provide a system and apparatus for air brakes whereby a service application of the brakes on the several cars composing a train may be made substantially simultaneously, without making an emergency application of the brakes on any car of the train, and to improve the construction of triple valves in the manner to be hereinafter more specifically pointed out, and to provide for more complete control of the triple valve, or triple valves, by an engineer or motorman.

Referring to the drawings which accompany this specification and form a part thereof, which drawings illustrate an embodiment of this invention, and on which drawings the same reference characters are used to designate the same elements wherever they may appear in each of the several views, Figure 1 is a schematic elevation of the air brake equipment of a car and the connections thereto from other units composing a train; Fig. 2 is a vertical longitudinal section on the line *a—a* on Fig. 3, of the triple valve; Fig. 3 is a vertical section of the triple valve taken on the line *b—b* on Fig. 2; Figs. 4, 5, 6 and 7 are vertical longitudinal sections of the triple valve similar to Fig. 2, but showing the parts in different positions; Fig. 8 is a section of the triple valve taken on line *c—c* on Fig. 2, looking in the direction of the arrows; Fig. 9 is a section of the triple valve on line *d—d* on Fig. 2, looking in the direction of the arrows; Fig. 10 is a section of the triple valve on the line *e—e* on Fig. 2, looking in the direction of the arrows; Fig. 11 is a section of the triple valve taken on line *f—f* on Fig. 2, looking in the direction of the arrows; Fig. 12 is a horizontal section of a part of the triple valve taken on the line *g—g* on Fig. 2, showing the slide valve seat in plan; Fig. 13 is a plan view of the bottom of the slide valve; and Figs. 14, 15, 16, 17, 18 and 19 are plan views of the slide valve seat, with the slide valve shown in dotted lines in certain selected positions thereon, and with the supplementary slide valve and plunger valve indicated in the respective positions which they occupy at the several positions of the slide valve indicated in dotted lines.

Referring specifically to the drawings, A designates a train pipe, parts being broken away, which is ordinarily secured beneath a car (not shown), and B designates car valves at the ends of the train pipe.

C designates ordinary forms of flexible connecting pipes provided with couplings D.

E designates the triple valve, F the brake cylinder, G the auxiliary reservoir, H a collector or compensating reservoir, I a pipe leading from the train pipe A to triple valve E and provided with a valve J, K a pipe leading from the brake cylinder head to the auxiliary reservoir G, L the brake cylinder head, M a pipe leading from the triple valve to the collector or compensating reservoir H, N a passage way leading from the triple valve through the brake cylinder head to the brake cylinder, and O a passage way in the brake cylinder head through which pipe K and auxiliary reservoir G are in communication with the triple valve.

The triple valve E is composed of a casting 1, provided with a nipple 2 for connecting the triple valve with the train pipe. The casting 1 is provided with a cylindrical part 3 within which a fluid actuatable member or piston 4 may be moved by differences in the pressures of air on opposite sides thereof.

The reference numeral 5 designates a head adapted to be bolted to casting 1, as shown, or otherwise secured thereto, packing 6 being used to secure air tight joints. The head 5 is provided on the interior thereof with air passage ways which are separated and formed by connected diaphragms 7 and 8 and web 9. In diaphragm 8 is provided the check valve port and seat 10, and the emergency valve seat and port 11. Opposite ports 10 and 11 and in line therewith, are hollow screw plugs 12 and 13, screwed into the head 5 and of sufficient diameter so that when they are unscrewed from the head the check valve 14 and the emergency valve 15 may be removed through the screw-threaded apertures provided for said hollow screw plugs. The check valve 14 is a wing valve and may be provided with a hollow stem 16 guided in and slidable within the hollow screw plug 12, and is ordinarily held to its seat by a spring 17. The emergency valve 15 is preferably a disk valve provided with packing 19 and with two oppositely extending stems 20 and 21. The emergency valve seat and port is preferably counterbored as shown, and a bushing 22 inserted therein, against which bushing the packing 19 of the emergency valve seats. The stem 21 of the emergency valve is guided in and slidable within the hollow plug 13 and the valve is held to its seat by a spring 23, until it is forced from its seat by the fluid actuatable member or piston 4, in the manner to be hereinafter described. The stem 20 is supported and guided in a bushing 24, secured within an aperture 25 in diaphragm 7, and diaphragm 7 is provided with a recess 26, into which the end of the stem 20 projects, as clearly shown by Fig. 2 of the drawings.

The cylindrical part 3 of the casting 1 is shown as provided with a cylindrical bore provided with a bushing 27, in which is the usual leak 28, to permit the compressed air to pass the piston 4 and its packing ring 29, to equalize the pressures in the auxiliary reservoir G and train pipe A, when the valve is in the running position, as shown by Fig. 2 of the drawings, the air passing from the train pipe through nipple 2 into chamber 30, from there through port 31 into chamber 32, through aperture 33 in diaphragm 7, into cylinder 34, through leak 28, and back of the piston through the valve seat bushing 35 into the auxiliary reservoir, until the air in the auxiliary reservoir is at the same pressure as the air in the train pipe.

Piston 4 is provided with a projection 36, which is adapted to contact with the stem 20 of emergency valve 15, to force the emergency valve off its seat when an emergency application of the brakes is made, such position of the parts being shown by Fig. 7 of the drawings. Piston 4 is also provided with a piston rod 37, which is provided with two slots 38 and 39, the slot 38 being shorter than slot 39, and both slots 38 and 39 being longer than the supplementary slide valve P and the main slide valve Q received therein respectively. That part of the casting 1 within which the main slide valve Q slides, is bored cylindrically and concentrically with cylinder 34, and a bushing 35 is inserted in the bore, said bushing being of generally cylindrical form, but is cut out at its bottom part to form a flat valve seat 41 and valve guides 42 and 43, as clearly shown by Fig. 8 of the drawings.

The valve seat 41 is provided with five ports 44, 45, 46, 47 and 48. Ports 44 and 45 are both in communication with the brake cylinder through chamber 49, port 40 and passage way N in the brake cylinder head. Port 46 is the exhaust port and leads from the valve seat to the outer atmosphere through passage way 50. Port 47 is in communication with the collector reservoir H through passage way 51 and pipe M. Port 48 is in communication with chamber 30, and this port is of smaller size than the ports heretofore mentioned, as is clearly shown by Figs. 2 and 12 of the drawings.

It will be understood of course that the interior of valve seat bushing 35 is in open communication at all times with the interior of auxiliary reservoir G and that the air pressures existing within said bushing and said auxiliary reservoir, are substantially identical. The main slide valve Q primarily controls the service application and release of the brakes by being moved back and forth by the piston 4, and alternately placing the brake cylinder in open communication with the auxiliary air reservoir G to set the brakes, and with the open atmosphere or exhaust, to release the brakes. In addition however, to these functions, the main slide valve Q is provided with a supplementary slide valve P and a plunger valve R, and with various ports and passages and recesses to be presently described, to attain the objects of this invention.

The main slide valve is provided with a bore 52 therethrough, which extends transversely of the valve and is in open communication with the air in valve seat bushing 35. Bore 52 intersects a longitudinal bore 53 in the valve at a point where said longitudinal bore is counterbored or enlarged to form a valve seat 54, against which plunger valve R is adapted to seat and be held thereagainst by spring 55 until moved therefrom in the manner to be presently described. The slot 39 is formed by projections from the piston rod 37 and the projection 56 is bifurcated or slotted to receive the plunger valve R, and the plunger valve R is provided with a collar or head 57, which is too large to pass through the said slot or bifurcation. The longitudinal bore 53 does not extend all the way through main slide valve Q, but terminates within the body of the valve, and a small port 58 opens therefrom through the top of the main slide valve, while a port 59 of substantially the same size as longitudinal bore 53, opens therefrom through the bottom face of the main slide valve and is enlarged longitudinally of the valve by recess 60. It will be noticed by reference to Fig. 13 of the drawings, that the port 59 is not in the same vertical plane as the longitudinal bore 53, but is offset therefrom by distance enough to bring port 59 and recess 60 in line with ports 45 and 46, the offsetting being easily accomplished by drilling an intersecting bore 61 through the side of the main slide valve and plugging its outer end. The bottom of the main slide valve is provided in line with port 59 and recess 60 with the elongated recess 62, which is in function and effect a D-slide valve to put port 45 leading to the brake cylinder, into communication with exhaust port 46 so that the air under pressure in the brake cylinder can escape therefrom, or to cut off communication between ports 45 and 46, so that air in the brake cylinder under pressure cannot escape therefrom.

In the bottom of the main slide valve and in line with recesses 60 and 62, is a third recess 63, from which a port 64 leads to the top of the main slide valve, for a purpose to be presently described.

The end 65 of the main slide valve, as shown by Fig. 13 of the drawings, is the end of the valve which lies at the right hand of ports 44 and 45 when the valve is on its seat, as shown by Fig. 12 of the drawings, and it will be noticed that the recess 62 places ports 45 and 46 in communication when the main slide valve is in the running position, as shown by Fig. 2 of the drawings, or in other words, in the running position of the main slide valve, the interior of the brake cylinder is always in open communication with the atmosphere.

Referring now to the other side of the bottom of the main slide valve, as shown by Fig. 13 of the drawings, the recess 66 is elongated like the recess 62, and is adapted and intended to put ports 44 and 47 in communication with each other, to permit air to flow from the collector or compensating reservoir H, into the air brake cylinder, and in another position of the main slide valve to put the ports 47 and 48 in communication with each other while cutting off communition between ports 44 and 47. This last mentioned position of the main slide valve is clearly shown by Fig. 5 of the drawings, and in the position shown, communication is afforded between ports 47 and 48, which places the train pipe A in communication with the collector or compensating reservoir H. The bottom of the main slide valve is also provided with a small recess 67 in line with recess 66 and ports 47 and 48, this recess being so located that it forms a leak between ports 48 and 47 when the parts are in their running position, as shown by Fig. 2 of the drawings so as to afford free and open communication but a restricted communication between the train pipe A and the collector or compensating reservoir H, to equalize the pressures therein when the parts of the valve, considered as a whole, are in the running position, as shown by Fig. 2 of the drawings.

The main slide valve Q is provided with upstanding guides 68 and 69, between which and on top of the main slide valve is retained the supplementary slide valve P, which in turn, is provided with upstanding guides 70 and 71, between which the piston rod 37 is free to move.

A spring 72, held on a pin 73, passed through guides 70 and 71 and bearing slidably against the top surface of the interior of the valve seat bushing 35, keeps the supplementary slide valve P on its seat on top of main slide valve Q and also keeps main slide valve Q on its seat 41.

Supplementary slide valve P and plunger valve R are graduating valves to effect a slow sensitive movement of the piston 4 and the movable triple valve mechanism as a whole, by first controlling small ports by the movements of piston 4 before larger ports are opened, thereby permitting the engineer or motorman to control the application and force of application of the brakes by manipulating his engineer's valve instead of his being limited to fully applying or fully releasing the brakes.

The supplementary slide valve P is provided with a single recess in its under face, so that this valve is in structure and function a D-valve, adapted to place ports 64 and 58 in the main slide valve Q in communication with each other, or to interrupt the communication between said ports.

It will be apparent from an inspection of Figs. 2 and 3 of the drawings, that the chamber 30 is always in open communication through port 31, with chamber 32 formed in the head 5, and through aperture 33 with the interior of the cylinder 34 on the left hand side of the piston 4, as the parts are shown by Fig. 2 of the drawings. It will also be apparent, from an inspection of the drawings, that chambers 74 and 49 are in open communication with each other and that they communicate with the interior of brake cylinder F through port 40 and passageway N in the brake cylinder head L. Chambers 74 and 49 are in open communication with each other through passageway 75 in the head 5 and passageway 78 in the casting 1. The reference numerals 76, 77 and 79 designate webs or partitions which in part incloses and form the passageways 75 and 78.

The function and operation of the system and apparatus are as follows: First, assuming that the car and its train are either in motion or at rest so that the positions of the several movable parts of the triple valve will be as shown by Fig. 2 of the drawings, the interior of the brake cylinder will be in communication with the atmosphere through passage way N, port 40, chamber 49, port 45, elongated recess 62, port 46 and passage way 50, and of course the brakes will be released. With the parts in the same positions the emergency valve 15 and the check valve 14 are closed, and the auxiliary reservoir is in communication with the train pipe through pipe K, passage way O, the interior of valve seat bushing 35, leak 28, cylinder 34, aperture 33, chamber 32, port 31, chamber 30 and pipe I, whereby the pressure of the air in the auxiliary reservoir is either being increased by air under higher pressure flowing thereinto from the train pipe, or else no air is moving from the train pipe to the auxiliary reservoir on account of the air pressures in the same being substantially identical. With the parts in the same position, the collector or compensating reservoir H is also in open communication with the train pipe through port 48, recess 67 and port 47, and air will be passing from the train pipe to the collector or compensating reservoir if the air pressure therein is lower than the air pressure in the train pipe, or air will not flow to the collector or compensating reservoir if the pressure therein is substantially the same as the pressure in the train pipe and chamber 30. The positions of the several movable parts remaining the same, the recess 80 in the bottom of the supplementary slide valve P will be over the ports 58 and 64, but no air can pass from one of these ports to the other, because plunger valve r is closed and port 59 and recess 60 are also closed. Suppose now, it is desired to make a service application of the brakes, the pressure in the train pipe is reduced sufficiently by the manipulation of the engineer's valve (not shown) so that the air in cylinder 34 will be exhausted, or in other words, its pressure will be reduced by part of the air contained in the cylinder 34 passing out therefrom through aperture 33, chamber 32, port 31, chamber 30, pipe I, into the train pipe A. The piston 4 and the movable parts connected therewith will immediately be forced to the left because of the higher pressure of the auxiliary reservoir air within valve seat bushing 35 acting upon the right hand side of the piston 4, as shown by Fig. 2 of the drawings. The piston 4 will move continuously to the left hand until it is stopped by its head 36 abutting against the stem 20 of the emergency valve 15. As we are considering only a service application of the brakes at this time, it will be understood that the air pressure in the train pipe has not been lowered enough to permit the piston 4 to move the emergency valve 15 against the tension of the spring 23, so that at the end of the stroke of the piston the parts will occupy the positions shown by Fig. 4 of the drawings. Returning now to the initial movement of piston 4 toward the left hand, the following actions take place in the order named: The piston and its piston rod 37 move until the end of recess 38 contacts with the end of the supplementary slide valve P without any action or movement of other movable members except the extension of spring 55, which is holding plunger valve R against its seat 54; on further movement of piston 4 and piston rod 37 to the left, supplementary slide valve P is moved to the left, removing the recess therein from over port 58, so that ports 58 and 64 are out of communication; a little more movement of piston 4 and piston rod 37 to the left moves supplementary slide valve P a little more to the left without further function or effect of this valve, but this additional movement of piston 4 and piston rod 37 moves projection 56 against the collar or head 57 on plunger valve R, and on further movement of piston 4 and piston rod 37 to the left, plunger valve R is moved off from its seat 54 and air flows or can flow from the auxiliary reservoir G through bore 52 into longitudinal bore 53, port 59 and recess 60 in main slide valve Q but cannot pass therefrom because the main slide valve Q has not been moved from its running position, as shown by Fig. 2 of the drawings; the piston 4 and piston rod 37 are still continuing their movements toward the left, carrying with them supplementary slide valve P and plunger valve R, and a slight movement brings the rear edge of main slide valve Q into contact with the rear end of the recess 39, and on continued movement of the piston 4 toward the left, all the movable parts connected and associated with the piston rod 37, move bodily to the left; referring now to the movements of the several recesses and ports in the main slide valve Q with reference to the ports 45, 46 and 44, 47, 48 in its valve seat 41, the operation is as follows: The elongated recess 62 is moved forward beyond port 45, thus shutting off the interior of the brake cylinder from the exhaust port 46, the recess 67 is moved forward away from port 47, thus cutting off communication momentarily between the reservoir 30 and train pipe A and port 47, and collector or compensating reservoir H; on further forward movement of the main slide valve Q, recess 63 and port 64 are brought into communication with port 45, but with no function or result, as ports 64 and 58 are not in communication with each other, but during this movement of the slide valve Q, recess 66 has been moved to connect ports 44 and 47 (after communication between ports 48 and 47 through recess 67 has been interrupted) so that at this position of the main slide valve Q, the collector or compensating reservoir H is cut off from communication with chamber 30, and the train pipe but is placed in communication through ports 47 and 44 with the interior of the brake cylinder, with the result that air flows from the collector or compensating reservoir H into the brake cylinder, increasing the air pressure in the brake cylinder and decreasing the pressure of the air in the collector or compensating reservoir; the further movement of the piston 4 and the movable parts associated therewith to the point where it is stopped from further movement by its head 36 abutting against stem 20 of emergency valve 15, brings port 59 and recess 60 over port 45, thereby allowing the air to flow from the auxiliary reservoir G in the manner hereinbefore described, through bore 52, longitudinal bore 53, intersecting bore 61, port 59 and recess 60, and port 45, into the brake cylinder F, while at the same time, recess 66 has been moved over ports 47 and 48, thereby permitting the air in train pipe A to exhaust into the collector or compensating reservoir H.

The reason for the use of the collector or compensating reservoir H is to vent or exhaust the train pipe of each car of a train substantially simultaneously when making a service application of the brakes, and without setting the emergency brakes on any car of the train. The problem involved is to vent the train pipe of each car of the train in making a service application of the brakes. It is not possible to vent the train pipe to the open atmosphere because such a venting of the train pipe would open the emergency valves and make an emergency application of the brakes where only a service application of the brakes was desired. It is not possible in practice to vent the train pipe into the brake cylinder, because the air capacity or air volume of the brake cylinder is variable according to the condition of the brake shoes and the lever connections. The piston in the brake cylinder may at some times have to move twice as far as at other times, to set the brakes, and if a car with such excessive travel of the brake piston is included in a train, and it were attempted to vent the train pipes into the brake cylinders to make a service application of the brake, the excessive travel of such a brake piston and the increased air volume of the brake cylinder caused thereby, would be sufficient to lower the pressure in the train pipe to such a point that the emergency valve would be opened and an emergency application of the brakes would be made instead of a service application of the brakes. It is not necessary here to set forth at length the undesirability of an emergency application being made on one or more or all the cars of a train when only a service application is intended.

It is of course understood by all persons familiar with the air brake art, that the condition which distinguishes a service application of the brakes from an emergency application of the brakes is the difference between the pressures of the air in the train pipe or train pipes and the air in the auxiliary reservoir or reservoirs, and that in practice only a few pounds difference of pressure in the train pipe distinguishes a service application from an emergency application.

The collector or compensating reservoir H is of a fixed, predetermined volume, which is determined by the air volume of the train pipe and its connections with the triple valve, and the maximum and minimum limits of volume of the brake cylinder, and as this determination is a mere matter of calculation, no more specific information is required in this specification than to state that the collector or compensating reservoir H acts as a mean proportional between the train pipe and the maximum and minimum volumes of the brake cylinder, so that while the compensating reservoir H may be freely vented into the brake cylinder F, whatever the air volume of the brake cylinder may have to be, the reduction of pressure in the collector or compensating reservoir H is such as to lower the pressure of the air therein below the normal running pressure of the air in the train pipe, but only within such safe limits that the train pipe can be freely vented into the collector or compensating reservoir H without diminishing the pressure in the train pipe to such a point that an emergency application of the brakes will be made.

It will be apparent from the foregoing explanation and description of the operation of the apparatus, that when a service application of the brakes is made, there will be a graduated application of the brakes on one car, instantly and practically simultaneously with a graduated application of the brakes on each and every car of the train, the operation being a successive operation step by step from car to car, as each car train pipe is vented into its collector or compensating reservoir H.

After the purpose and objects of the service application of the brakes have been realized, the brakes are released in the ordinary manner by increasing the pressure in the train pipe above the pressure exerted on piston 4 by the air in auxiliary reservoir G, and piston 4 is moved from its position as shown by Fig. 4 of the drawings, back to the position shown by Fig. 2 of the drawings, but during this movement the following movements and operations of parts take place: As the piston 4 and piston rod 37 are moved to the right (see Fig. 4 of the drawings) the left hand end of recess 38 contacts with the end of supplementary slide valve P after projection 56 has moved a sufficient distance to permit the plunger valve R to be seated against its seat 54 by spring 55, and on further movement of piston 4 and piston rod 37 to the right, the recess 80 in the bottom of the supplementary slide valve P will be moved over ports 58 and 64, and on further movement of piston 4 and piston rod 37 to the right, main slide valve Q will be contacted with by the end of recess 39 and all of the movable parts associated with piston 4 and piston rod 37 will then be moved bodily to the right hand, moving recess 60 and port 59 out of communication with port 45, putting recess 63 and port 64 momentarily in communication with port 45 to permit a graduated reduction of the pressure in the brake cylinder, and finally putting ports 46 and 45 into communication by means of recess 62, to completely exhaust the compressed air from the brake cylinder, and in the meantime, recess 66 has been moved from over ports 47 and 44, cutting off communication between ports 47 and 44, and establishing communication between ports 47 and 48 by recess 67.

It will be readily seen that an engineer or motorman by suitably actuating the engineer's valve, can so control the movements of piston 4, that only the graduated valves P and R need necessarily be moved by the movements of piston 4, and that therefore the engineer or motorman has a very sensitive control over either the application of the brakes or the release of the brakes.

The reference numeral 81 designates a chamber in the head 5 within which emergency valve 15 is inclosed in the ordinary manner, and this chamber 81 is in communication with the train pipe A by any suitable connection (not shown), so that when an emergency application of the brakes is made in the ordinary manner, emergency valve 15 will be forced off its seat by the head or projection 36 on piston 4, thereby permitting the air under pressure to rush in large volume from the train pipe A through chamber 81, past valve 15, through port 11, into chamber 18, forcing check valve 14 from its seat and passing into chamber 74 and from thence through chamber 49 and port 40 into the brake cylinder.

What is claimed is:

1. The combination with an individual car train pipe, of an auxiliary reservoir and brake cylinder, a collector or compensating reservoir and valve mechanism adapted to be actuated by differences between the pressure of air in the train pipe and the pressure of the air in the auxiliary reservoir, to first vent air from the collector or compensating reservoir into the brake cylinder and thereafter to vent air from the train pipe into the collector or compensating reservoir to reduce the pressure of the air in the train pipe.

2. The combination with an individual car train pipe, auxiliary reservoir, brake cylinder and a collector or compensating reservoir, of valve mechanism adapted to be actuated by differences between the pressure of air in the train pipe and the pressure of the air in the auxiliary reservoir and adapted in one position to permit air to enter both of said reservoirs from the train pipe to charge the same and in other positions to first vent air from the collector or compensating reservoir into the brake cylinder and thereafter to stop the venting of air from the collector reservoir into the brake cylinder and vent air from the auxiliary reservoir to the brake cylinder to set the brakes and vent air from the train pipe into the collector reservoir to reduce the pressure of the air in the train pipe.

3. The combination with an individual car train pipe of a triple valve device, a brake cylinder, an auxiliary reservoir and a collector or compensating reservoir, said triple valve device including a casing provided with ports, a main valve provided with ports, graduating valves to control the flow of air through the ports of the main valve, and a fluid actuatable member adapted to move said several valves together or to move the graduating valves independently with respect to the main valve, restricted passageways controlled by said movable parts being provided to place the train pipe in communication with the auxiliary reservoir and the collector or compensating reservoir when the parts are in running positions, the construction and arrangement being such that when the parts are in the running positions the brake cylinder is in open communication with the atmosphere through the exhaust port in the casing and the train pipe is in communication with the auxiliary reservoir and with the collector or compensating reservoir and when the parts are moved to position for service application of the brakes the brake cylinder is cut off from exhaust, air is exhausted from the collector or compensating reservoir into the brake cylinder and then air is exhausted from the train pipe into the collector or compensating reservoir.

4. The combination with an individual car train pipe of a triple valve device, a brake cylinder, an auxiliary reservoir and a collector or compensating reservoir, said triple valve device including a casing provided with ports leading from the interior thereof to the brake cylinder, an exhaust port leading to the atmosphere, a port leading to the collector or compensating reservoir and a smaller port leading to the train pipe, a main valve provided with recesses adapted to coact with ports in the casing and also provided with a bore communicating with ports in the valve, a graduating valve to control the flow of air from the auxiliary reservoir to the brake cylinder through said bore, another graduating valve to control exhaust of air from the brake cylinder, and a fluid actuatable member adapted to move said several valves together or to move the graduating valves indepcndently with respect to the main valve, a restricted passageway controlled by a movable part being provided for charging the auxiliary reservoir from the train pipe, the construction and arrangement being such that when the parts are in running positions the train pipe is in communication with the auxiliary reservoir through the restricted passageway and with the collector or compensating reservoir through the smaller port and when the parts are moved to positions for service application of the brakes the brake cylinder is cut off from exhaust, air is exhausted from the collector or compensating reservoir into the brake cylinder and then air is exhausted from the train pipe into the collector or compensating reservoir.

In witness whereof I hereto affix my signature in presence of two witnesses.

NIELS A. CHRISTENSEN.

Witnesses:
 CHAS. L. GOSS,
 F. E. DENNETT.